Nov. 15, 1932.   R. H. WORRALL   1,887,705
VARIABLE SPEED DEVICE
Filed Nov. 10, 1931   2 Sheets-Sheet 1
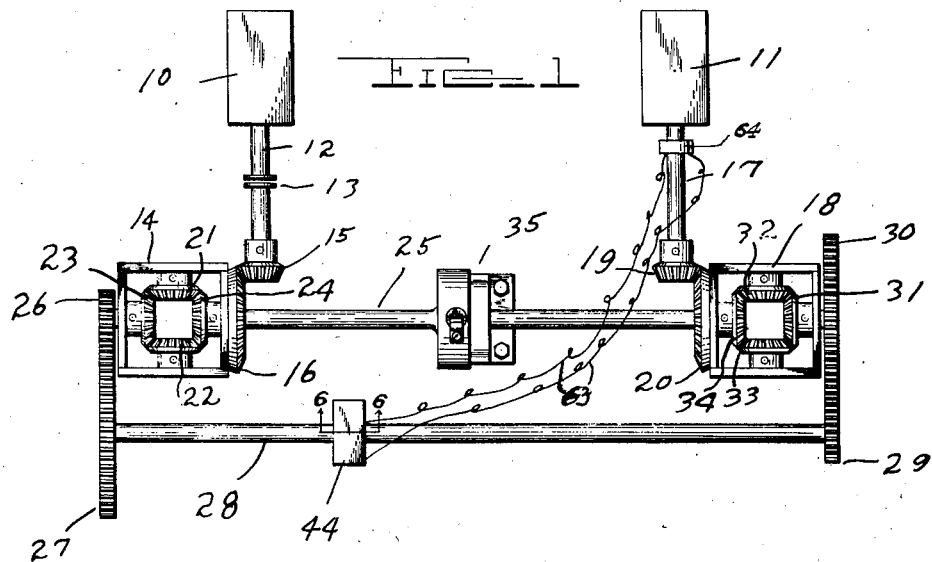
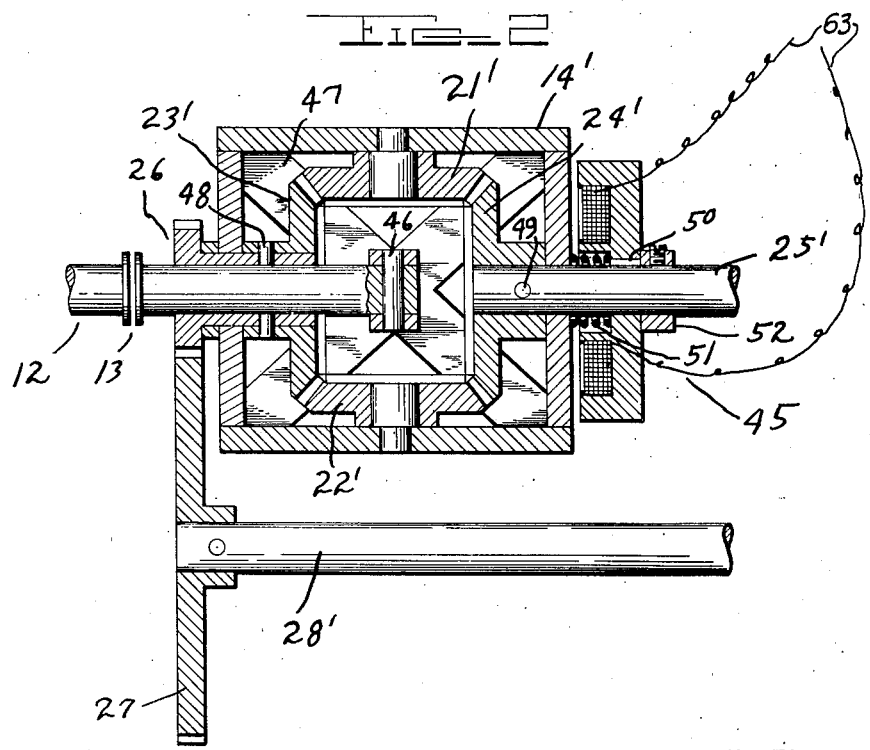
INVENTOR
Robert H. Worrall
BY
ATTORNEY

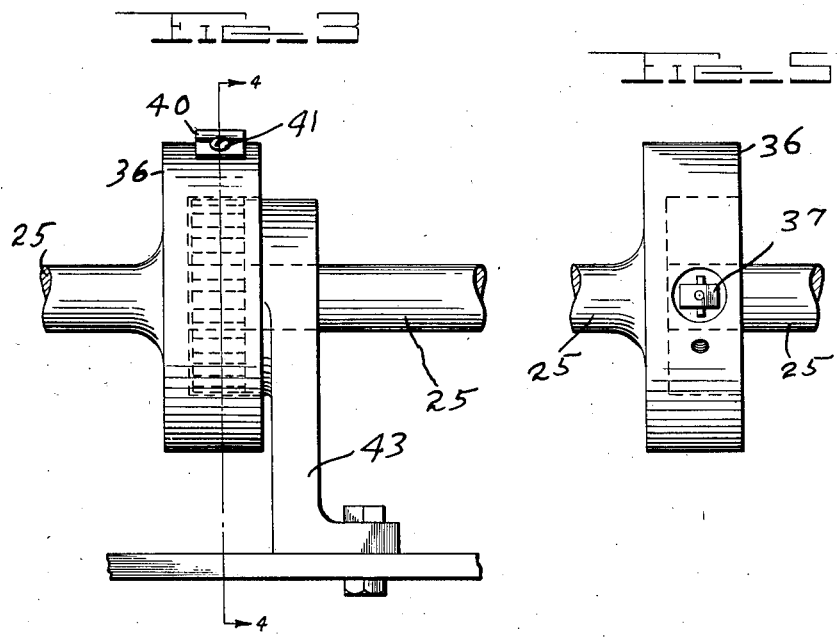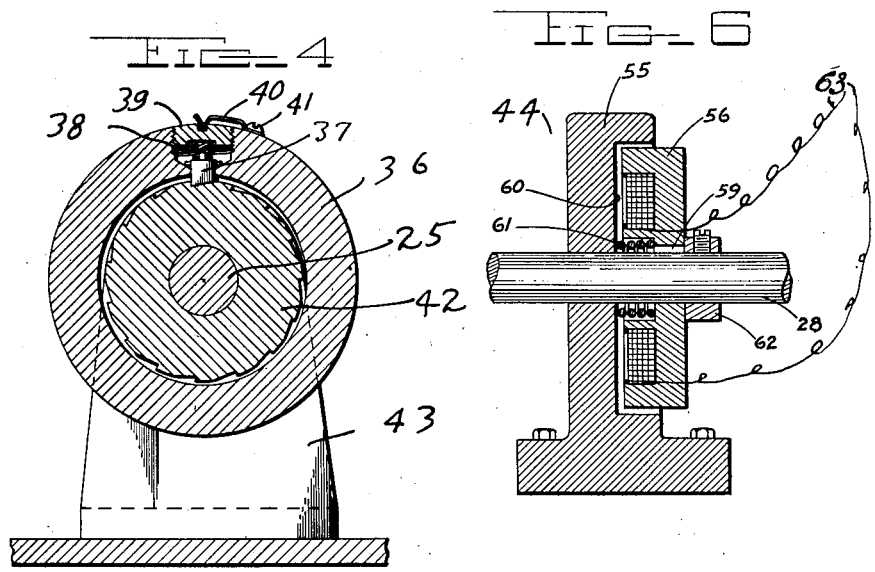

Patented Nov. 15, 1932

1,887,705

UNITED STATES PATENT OFFICE

ROBERT H. WORRALL, OF WASHINGTON, DISTRICT OF COLUMBIA

VARIABLE SPEED DEVICE

Application filed November 10, 1931. Serial No. 574,152.

(GRANTED UNDER THE ACT OF MARCH 3, 1883, AS AMENDED APRIL 30, 1928; 370 O. G. 757)

This invention relates to a variable speed device and has for an object to provide an improved transmission means between a power supply and a torque load wherein the gear ratio between the power supply and the load varies automatically according to the ratio between the load and the power supply.

A further object of this invention is to provide an automatic transmission between the power supply and the load wherein there will be a low speed or large gear ratio between the power supply and the load when the load torque is high as when a high starting torque is present, and which will gradually and automatically shift over to a direct drive between the power supply and the load as the load approaches the same speed as the power supply.

A further object of this invention is to provide an automatic power transmission wherein at low speeds the power will flow through a pair of differentials, allowing a proper gear ratio to be interposed between the power supply and the load and wherein the pair of differentials will gradually cause power through low speed and high speed shafts to balance, and thereafter a direct drive or a one-to-one gear ratio between the power supply and the load may be caused by the automatic or manual operation of a clutch on one of the shafts.

A further object of this invention with reference to gear shift devices, such as in automobiles, is to provide an automatic transmission with a continuously variable transmission ratio, wherein one of a pair of differentials is substituted for the normally used gear shift box whereby the gear ratio is automatically and continuously varied.

A further object of this invention is to provide a variable speed device which is applicable to any type of load requiring a high starting torque, such as synchronous motor loads, cranes, battleship turret turning and rolling mill apparatus, and which may likewise be applied to automobiles or other vehicles requiring a high starting torque and thereafter a constant drive.

With the above and other objects in view, the invention consists in the construction, combination and arrangement of parts as will be described more fully hereinafter.

In the drawings, Fig. 1 is a plan view showing the details schematically;

Figure 2 is a cross sectional view, of a detail showing a modified form which includes a magnetic clutch;

Fig. 3 is an enlarged view of the non-reversing ratchet on the high speed transmission;

Fig. 4 is a section on line 4—4 of Fig. 3;

Fig. 5 is a top plan view of a broken section of the high speed shaft forming part of the ratchet arrangement;

Fig. 6 is a section on line 6—6 of Fig. 1.

There is shown at 10 a schematic representation of a motor which may be a synchronous motor for use in operations requiring a high starting torque or it may be a gas engine or other motor. 11 represents schematically the driven apparatus or load, which in the case of an automobile or other vehicle would represent the rear axle or the drive shaft of the rear axle. The motor 10 has a drive shaft 12 including a clutch 13 for driving the differential box 14 through the bevel gear 15 fixed on shaft 12 and the bevel gear 16 fixed on differential box 14. Similarly, the driven load 11 is connected through a driven shaft 17 through the differential box 18 by the intermediary bevel gear 19 fixed on shaft 17 and bevel gear 20 fixed on differential box 18.

The differential box 14 has a pair of bevel pinions 21 and 22 each intermeshed with a pair of bevel gears 23 and 24. The bevel gear 24 is pinned to the high speed or direct drive shaft 25 and bevel gear 23 is pinned to rotate with the small gear 26. The small gear 26 meshes with a large gear 27 which is fixed at one end of the low speed shaft 28. A small gear 29 at the other end of low speed shaft 28 meshes with large gear 30 to which is pinned the bevel gear 31 in differential box 18. The bevel gear 31 meshes with a pair of pinions 32 and 33 in the differential box 18 and pinions 32 and 33 in turn mesh with the bevel gear 34 pinned on the other end of high speed shaft 25.

To prevent the shaft 25 from tending to rotate in the opposite direction, a non-reversing ratchet arrangement 35 is provided, shown in detail in Figures 3, 4 and 5. This comprises an enlarged cup 36 on shaft 25, having a ratchet pawl 37 held therein by a spring 38 and a stud screw 39. A spring 40 held in position by a screw 41 holds the stud screw 39 in proper adjusted position. A fixed ratchet 42 is secured to support 43.

To assemble the ratchet arrangement it is only necessary to insert the right end of shaft 25, as shown in Figure 1, before it is pinned to bevel gear 34 through the opening in the fixed ratchet 42, then place the ratchet pawl 37 in position with the spring 38 and stud screw 39 holding it in operating position. As will be obvious, the shaft 25 may then rotate freely in a clockwise direction as shown in Figure 4, and cannot rotate at all in a counter-clockwise direction. The low speed shaft 28 has, shown schematically at 44, an automatic or manual friction clutch or brake arrangement for stopping the operation of the low speed shaft 28 when it is desired to drive directly through the high speed shaft 25.

In operation, the motor 10 through shaft 12 rotates the bevel gear 15 and differential box 14 through bevel gear 16. The tendency of high speed shaft 25, which is pinned to bevel gear 24, to rotate in the opposite direction is checked by the ratchet arrangement 35. Accordingly, the bevel gear 24 remains momentarily stationary and the pinions 21 and 22 rotating thereabout, rotate the bevel gear 23 and thus rotate gears 26 and 27, shaft 28, gears 29 and 30 and bevel gear 31. Bevel gear 31, in rotating, rotates pinions 32 and 33, thus rotating differential box 18 and bevel gear 20 which in turn rotates bevel gear 19 and shaft 17 and thus operates the load 11.

Assuming that motor 10, providing a given torque, acts upon the load 11 through two media; i. e., either direct drive shaft 25 or low speed shaft 28 or both, and if either shaft 25 or shaft 28 is locked by any reason whatever the other will have to supply the torque to the load. As long as load 11, (an automobile being referred to as load 11), is sufficient to maintain the car speed below the point where the clutch 44 operates, there will be a reverse torque on direct drive shaft 25 except under the following conditions:

(a) At the point where the car speed is such that due to the initial impulse from motor 10 the car actually drives motor 10 for a short period, as when coasting in gear, the torque on shaft 25 will then reverse as the power is flowing in the other direction. Shaft 25 will then turn in the same direction that motor 10 would ordinarily turn it if no reverse torque were present.

(b) If the car (assumed to be on a level) is given an initial impulse such that the speed reaches a value where the clutch 44 starts to take hold, the relation between the forward torque on shaft 25 from motor 10 to the reverse torque from load 11 gradually changes. As the clutch 44 increases its torque resistance via support 55 the reverse torque and the forward torque on shaft 25 finally reach a point of equilibrium. When the clutch locks with support 55 the torque will have to be transmitted to the load through the shaft 25.

(c) Again, if the car speed reaches such a value that the clutch 45 of Fig. 2 starts to take hold of differential box 14' the relation between the forward torque on shaft 25 to the reverse torque will gradually change as in (b) above but at a faster rate. As the clutch 44, Fig. 6, increases its torque resistance via shaft 55 the torque times the speed (power) is lost until the clutch 44 is locked to shaft 55. When the clutch 45, Fig. 2, starts to take hold of differential box 14' there is no loss of power as referred to above, as the torque is transferred to differential box 14' then to direct drive shaft 25', and thence to the load. When differential box 14' is locked to direct drive shaft 25', direct drive is established. The direct power drive operates through bevel gear 15 and bevel gear 16 to rotate box 14 and through pinions 21 and 22 to rotate bevel gear 24, while bevel gear 23 tends to slow down. As is obvious, bevel gear 23 slows down, as bevel gear 24 increases its speed of rotation.

Bevel gear 24 operates the high speed shaft 25 to similarly rotate bevel gear 34 and through pinions 32 and 33 rotate differential box 18 and bevel gear 20 and transmit the power to the bevel gear 19 to load 11. Thus it will be seen that the direct drive takes place from motor 10 to load 11 through shaft 25, while the low speed drive takes place through the intermediary of the gears 26 and 27, shaft 28 and gears 29 and 30.

When in operation, there would be a tendency for the power to flow both through high speed shaft 25 and low speed shaft 28; that is, the amount of power flowing through each shaft would balance. When this point of balance has been reached or approached, it is desirable to cause all the power to flow through the high speed shaft and this is done by either manually or automatically bringing into operation a friction clutch arrangement schematically shown at 44, to stop the operation of shaft 28, thus causing the power to flow entirely through shaft 25.

The clutch arrangement shown schematically at 44 may be operated by an electrical arrangement as shown in Figure 6. The shaft 28 rotates through a fixed support 55. An electromagnet 56 splined to shaft 28 on the key 59 is held away from the clutch face 60 of support 55 by a spring 61 against stop 62. A generator (not shown) driven in direct proportion to the speed of load 11 supplies current to the electromagnet 56. When a predetermined speed of the load has been reached, the electromagnet 56 will compress spring 61 to clutch with face 60 of support 55, thus stopping the rotation of shaft 28, and causing all the power to flow through high speed shaft 25. When the speed of the load 11 drops below the predetermined speed, the electromagnet 56 will release from face 60 thus allowing low speed shaft 28 to turn and take up part or all of the load, depending on the torque present.

There is shown in Figure 2 a modified form wherein the clutch 44 on shaft 28 is eliminated and an electromagnetic clutch arrangement 45 serves to automatically provide a direct drive when the starting torque has disappeared and to allow the low speed shaft 28 to again come into operation when the starting torque is again present or when the speed of the load has dropped. In this arrangement the shaft 12 is pinned at 46 to the spider 47 fixed in the differential box 14'. Differential box 14' has similar pinions 21' and 22' meshing with the gears 23' and 24', the bevel gear 23' being pinned at 48 to the gear 26 for transmitting power through gear 27 and low speed shaft 28', while the bevel gear 24' is pinned at 49 to the high speed or direct drive shaft 25'. The shafts 25' and 28' are connected through the differential box 18 and gears 29 and 30 identically as shown in Figure 1. The electromagnetic clutch arrangement 45 is splined on shaft 25' by the key 50 and is held away from the differential box 14' by spring 51 against stop 52. Leads 63 from the electromagnetic clutch 45 are led to a generator 64 driven in direct proportion to the speed of the load 11.

When the motor 10 turns the shaft 12 to turn differential box 14', the clutch 45 is in position shown in Figure 2, there being no current flowing therethrough from the generator. Accordingly, differential box 14', through pinions 21' and 22', rotates bevel gear 23' and gear 26 causing the power to flow through low speed shaft 28'. Then, as the load 11 starts up the speed, the current from the generator will move the electromagnetic clutch 45 to lock against differential box 14', thus causing the differential box 14' to be locked to the high speed shaft 25', due to the key 50. The power will then flow directly from shaft 12 through spider 47 and differential box 14' to magnetic clutch 45 and shaft 25', while the pinions and gears in the box will operate idly and deliver no power to gear 26 except as caused by friction. When the load 11 dies down, the speed of the generator, driven in proportion thereto will die down also, allowing magnetic clutch 45 to be released by spring 51, thus causing the low speed transmission to automatically come into operation.

It will be understood that the above description and accompanying drawings comprehend only the general and preferred embodiment of my invention, and that various changes in construction, proportion and arrangement of parts may be made within the scope of the appended claims and without sacrificing any of the advantages of my invention.

The herein described invention may be manufactured and used by or for the Government of the United States of America for governmental purposes without the payment of any royalties thereon or therefor.

I claim:

1. In an automatic variable speed transmission device from a power source to a load, a direct drive shaft and a low speed drive shaft, differential means at each end of one of said shafts, gear means connecting said differential means and the other of said shafts, means connecting one of said differentials to the power source and the other of said differentials to said load, and clutch means on one of said shafts for causing only one of said shafts to be allowed to operate.

2. An automatic variable speed transmission device for use between a power source and a load, a differential gear connected to the power source and a differential gear connected to the load, a high speed shaft connecting said differentials, a low speed shaft geared to said differentials through different sized gears, a ratchet device secured about one of said shafts to permit motion in one direction and automatic clutch means on one of said shafts causing one of said shafts to operate in direct ratio with said power source.

3. An automatic variable speed transmission device for use between a power source and a load, a differential gear connected to the power source and a differential gear connected to the load, a high speed shaft connecting said differentials, a low speed shaft geared to said differentials through different sized gears, a ratchet device secured about one of said shafts to permit motion in one direction, automatic clutch means on one of said shafts causing one of said shafts to operate in direct ratio with said power source, and means controlled by the speed of the load to operate said automatic clutch means.

4. An automatic variable speed transmission, comprising a driving shaft and a driven shaft, a differential connected to said driving shaft, a differential connected to said driven shaft, a pair of pinions and a pair of bevel gears in each of said differentials, one of each pair of bevel gears being connected by a direct ratio drive shaft, means connecting each of the other bevel gears of said pairs for transmitting motion from one to the other at a different ratio, said means comprising a small gear connected to the latter bevel gear of said driving shaft differential, a large gear meshing with said small gear, a low speed shaft affixed to said large gear at one end, a small gear at the other end of said low speed shaft and a large gear meshing with said latter small gear, said large gear being connected to said latter bevel gear in said driven shaft differential.

5. An automatic variable speed transmission for use between a power source and a load, comprising a driving shaft connected to the power source and a driven shaft to the load, a differential connected to said driving shaft, a differential connected to said driven shaft, a pair of pinions and a pair of bevel gears in each of said differentials, one of each pair of bevel gears being connected by a direct ratio drive shaft, means connecting each of the other bevel gears of said pairs for transmitting motion from one to the other at a different ratio, said means comprising a small gear connected to the latter bevel gear of said driving shaft differential, a large gear meshing with said small gear, a low speed shaft affixed to said large gear at one end, a small gear at the other end of said low speed shaft, a large gear meshing with said latter small gear, said large gear being connected to said latter bevel gear in said driven shaft differential, a ratchet device on said direct ratio shaft, and a clutch device on one of said shafts causing one of said shafts to operate in direct ratio with said power source.

ROBERT H. WORRALL.